United States Patent [19]

Kuiper et al.

[11] Patent Number: 5,663,279

[45] Date of Patent: Sep. 2, 1997

[54] OPHTHALMIC LENSES

[75] Inventors: Hans Leonard Kuiper, Velp; Robert Winston van de Graaf, Arnhem; Mieke Ruisch-Mocking, Hilversum, all of Netherlands

[73] Assignee: Akzo Nobel nv, Arnhem, Netherlands

[21] Appl. No.: 600,956

[22] PCT Filed: Aug. 5, 1994

[86] PCT No.: PCT/EP94/02595

§ 371 Date: Apr. 11, 1996

§ 102(e) Date: Apr. 11, 1996

[87] PCT Pub. No.: WO95/06266

PCT Pub. Date: Mar. 2, 1995

[30] Foreign Application Priority Data

Aug. 24, 1993 [NL] Netherlands .......... 93202480

[51] Int. Cl.$^6$ .................... C08G 64/00
[52] U.S. Cl. .................... 528/196; 528/198
[58] Field of Search .................... 528/196, 198

[56] References Cited

U.S. PATENT DOCUMENTS 4,959,451 9/1990 Uchida et al. .......... 528/272

FOREIGN PATENT DOCUMENTS

| 0 035 304 | 9/1981 | European Pat. Off. ........ C07C 69/96 |
| 0 284 139 | 9/1988 | European Pat. Off. ....... C08F 218/24 |
| 0 473 163 | 3/1992 | European Pat. Off. ........ C08F 18/24 |
| 0 540 003 | 5/1993 | European Pat. Off. .......... G02B 1/04 |
| 0 540 043 | 5/1993 | European Pat. Off. .......... G02B 1/04 |
| 0 593 877 | 4/1994 | European Pat. Off. .......... G02B 1/04 |

OTHER PUBLICATIONS

Abstract Derwent, 1995, J03054213.

Abstract No. 91–299693/41 for, JO 3199–218–A, Dec. 27, 1989.

Encyclopedia of Chemical Technology, Kirk Othmer, Third Edition, vol. 2, John Wiley & Sons, pp. 111–112. No Date.

*Primary Examiner*—Terressa Mosley
*Attorney, Agent, or Firm*—Ralph J. Mancini; Louis A. Morris

[57] ABSTRACT

The present invention relates to ophthalmic lenses with a refractive index from 1.50 to 1.51, which are the cured product of compositions comprising 60–99% wt % of at least one poly(allyl carbonate) of a polyhydroxy alcohol, said polyhydroxy alcohol having from 2 to 20 carbon atoms and from 2 to 6 hydroxy groups in the molecule, less than comonomers, and 0.01 to 10 wt % of a radical initiator. These ophthalmic lenses have the advantages of improved tintability and a low rejection rate in their production due to the reduction in prerelease during polymerization casting. Preferably, the ophthalmic lenses and the use of diallyl phthalate type oligomers in ophthalmic lenses.

10 Claims, No Drawings

OPHTHALMIC LENSES

The present invention relates to ophthalmic lenses, a process for the production of ophthalmic lenses and the use of diallyl phthalate type oligomers in ophthalmic lenses.

Recently, organic glass has begun to replace inorganic glass in optical elements, such as windows, prisms, cameras, television screens, telescopes, and ophthalmic lenses. By ophthalmic lenses is meant corrective lenses as well as non-corrective lenses such as sunglasses. Organic glass possesses several favourable characteristics, including a lighter weight and better safety than inorganic glass.

Conventional materials used in organic glass include polystyrene resin, polymethyl methacrylate resin, and polycarbonate resin. However, these polymers have their respective disadvantages. For example, polymethyl methacrylate resin is liable to high moisture absorption which changes its shape and refractive index. Also, polystyrene resin and polycarbonate resin have the disadvantage of giving rise to birefringence, light scattering, and loss of transparency with time. Furthermore, polymethyl methacrylate and polystyrene are neither scratch nor solvent resistant.

Organic glass made up of the products of the radical polymerization of poly(allyl carbonates) of polyhydroxy alcohols is also known, for example from European patent application 0 473 163. These polymers do not have the above-mentioned problems. However, when applying poly(allyl carbonates) of polyhydroxy alcohols in ophthalmic lenses two other problems often occur, i.e. tinting failure and prerelease in the mould.

Tinted ophthalmic lenses, including both corrective and non-corrective lenses (e.g. for sunglasses), are prepared almost exclusively by means of surface impregnation, immersing the ophthalmic lenses in aqueous dispersions of dyes. However, ophthalmic lenses made from poly(allyl carbonates) of polyhydroxy alcohols often show inhomogeneous tinting of the surface in the form of arches. This tinting failure in tinted ophthalmic lenses results in the rejection of a large percentage of the lenses produced because they are not suitable commercial products.

Prerelease or premature release in the mould is a phenomenon whereby the casted ophthalmic lens tends to come loose from the mould's surface during polymerization. Accordingly, failures occur on the surface of the lens and without correction by grinding and/or polishing, the lens cannot be used. In finished lenses made from poly(allyl carbonates) of polyhydroxy alcohols this prerelease is an especially significant problem.

A finished lens is a type of corrective lens for which the final shape is determined by the dimensions of the mould. Accordingly, after removing the lens from the mould it should have the right curvature and power without needing to be processed further. This requires that the product of the polymerization casting of the finished lens meet the end-product specifications since there are no further processing steps to correct defects in the lens. The use of poly(allyl carbonates) of polyhydroxy alcohols to make finished lenses results in the rejection of up to 70% of the finished lenses produced because of the occurrence of prerelease during polymerization casting.

Although we do not wish to be bound by any theory it is thought that prerelease occurs because of the shrinkage common to poly(allyl carbonates) of polyhydroxy alcohols. For example, diethylene glycol diallyl carbonate shrinks 14% during polymerization, Kirk Othmer, *Encyclopedia of Chemical Technology*, 3rd ed., John Wiley & Sons, 1978, Vol. 2, p. 112. In addition, the shrinkage does not occur uniformly. Accordingly, the prerelease in finished lenses could be the result of shrinkage during polymerization casting. More particularly, because the thickness of the finished lens differs widely from the edge to the centre of the lens, the amount of shrinkage also differs widely and thus prerelease of the finished lens occurs quite frequently. Therefore, the problem of prerelease must be solved.

One method of preventing premature release is by the use of adhesion promotors in poly(allyl carbonates) of polyhydroxy alcohols. Examples of these adhesion promotors are silane and maleic anhydride. However, this method fails to significantly reduce the prerelease. Furthermore, the adhesion promotors increase the adhesion to glass moulds resulting in higher rate of mould damage.

Accordingly, it is the primary object of the present invention to provide an ophthalmic lens which is uniformly tintable. It is another object of the present invention to provide an ophthalmic lens which can be produced with a minimum of prerelease, so that the rejection rate of these ophthalmic lenses, especially finished lenses, can be reduced significantly.

The present invention relates to an ophthalmic lens with a refractive index from 1.50 to 1.51, comprising the cured product of a composition comprising 60–99 wt % of at least one poly(allyl carbonate) of a polyhydroxy alcohol, said polyhydroxy alcohol having from 2 to 20 carbon atoms and from 2 to 6 hydroxy groups in the molecule, 0.01–10 wt % of at least one radical initiator, and 0–20 wt % of comonomers, characterized in that at least one diallyl phthalate type oligomer is present in the composition, in an amount of less than 10 wt %, said diallyl phthalate type oligomer being of the formula I

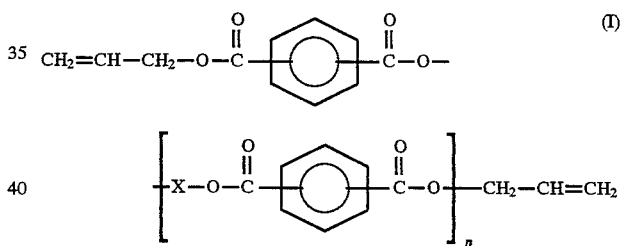

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100, said oligomer having a degree of unsaturation of 20–100 in terms of iodine value measured according to the Wijs method.

Ophthalmic lenses according to the present invention are tintable without a high rate of tinting failure. Furthermore, the rejection rate in the production of the ophthalmic lenses of the present invention, especially the finished lenses, is lowered significantly because of the reduction of prerelease during the polymerization casting.

The ophthalmic lenses of the present invention require a refractive index of 1.50 to 1.51. More particularly, moulds used in today's industry to prepare ophthalmic lenses from poly(allyl carbonate) of a polyhydroxy alcohol (refractive index=1.498) are only suited for compositions which result in ophthalmic lenses with comparable refractive indices. A change in refractive index will result in a change in power of the lens when applying the same moulds. Compositions resulting in high refractive index lenses will require different moulds to obtain ophthalmic lenses with the same power. So, improvement of the properties of lenses by introducing certain oligomers and, optionally, comonomers, cannot be done without limiting the refractive index of the resulting lens so that the moulds do not have to be changed. Japanese patent application 0 3199 218 discloses a curable composition comprising at least 10 wt % of a diallyl phthalate type oligomer, a vinyl comonomer, such as diethylene glycol diallyl carbonate, and a radical initiator. This composition may be used in optical elements such as high refractive index lenses. According to the description, cured compositions based solely on diethylene glycol diallyl carbonate have a too low refractive index resulting in thick lenses for intensive correction. Furthermore, cured compositions with less than 10 wt % of diallyl phthalate type oligomer have poor impact resistance and poor heat resistance. In addition, the application does not mention the advantages of improved tintability or reduced prerelease during casting. So, the present invention is not disclosed by JP-A-0 3199 218. The application teaches even away from the present invention in the fact that in view of this disclosure a skilled man would not choose a composition comprising less than 10 wt % diallyl phthalate type oligomer to produce ophthalmic lenses.

Japanese patent application 0 3054 213 discloses a similar composition as JP-A-0 3199 218. This composition may be used in coatings, sealants, paints, adhesives, and optical elements. This Japanese patent publication never mentions ophthalmic or finished lenses. Neither are the present advantages of improved tintability or reduced prerelease during casting disclosed. Accordingly, this Japanese patent application does neither disclose the present invention.

European patent application 0 473 163 discloses a liquid composition comprising a poly(allyl carbonate) of a polyhydroxy alcohol and 0.01–1 wt % of an aliphatic polyol to improve the tintability of a lens produced from this liquid composition. Optionally, monomers may be present, such as diallyl phthalate, in an amount of up to 50 wt %. Accordingly, the improvement in tintability through the use of diallyl phthalate type oligomer of the formula I instead of via the addition of a polyol is not part of this disclosure. In addition, no mention is made of the problems relating to premature release in the mould during the production of ophthalmic lenses, especially finished lenses, from poly (allyl carbonates) of polyhydroxy alcohols.

The poly(allyl carbonates) of polyhydroxy alcohols may be used in the form of either monomers or oligomers. Monomers are usually obtained by using chloroformates. In this way, diethylene glycol diallyl-carbonate can be obtained by reacting diethylene glycol bis(chloroformate) with allyl alcohol in the presence of an alkali, as described in Kirk-Othmer, *Encyclopedia of Chemical Technology*, 3rd ed., John Wiley & Sons, 1978, Vol. 2, p. 111. Monomers and oligomers of poly(allyl carbonates) of polyhydroxy alcohols can also be suitably obtained by means of transesterification reactions between diallyl carbonate and a polyhydroxy alcohol, as described in European patent application 0 035 304. In this way, monomers or mixtures of monomers and oligomers can be obtained, depending on the ratio of diallyl carbonate reagents to polyhydroxy alcohol. It is also possible to obtain mixed poly(allyl carbonates) of polyhydroxy alcohols by reacting a diallyl carbonate with a mixture of polyhydroxy alcohols in a transesterification reaction. These mixed poly(allyl carbonates) of polyhydroxy alcohols are also included in the present invention. Monomers of poly (allyl carbonates) of polyhydroxy alcohols are preferred for the ophthalmic lens of the present invention.

The polyhydroxy alcohols used in the preparation of poly(allyl carbonates) of polyhydroxy alcohols contain from 2 to 20 carbon atoms and from 2 to 6 hydroxy groups in the molecule. Examples of these alcohols are: ethylene glycol, diethylene glycol, triethylene glycol, tetraethylene glycol, 1,3-propylene glycol, 1,4-butanediol, 1,6-hexanediol, neopentyl glycol, 2,2,4-trimethyl-1,3-pentanediol, 1,4-dimethanol cyclohexane, 4,8-bis(hydroxyethyl) tricyclo(5, 2.1,0$^{2,6}$)decane, α,α'-xylenediol, 1,4-bis(hydroxyethyl) toluene, 2,2-(bis(4-hydroxyethyl)phenyl) propane, pentaerythritol, trimethylol propane, dipentaerythritol, ditrimethylol propane, and tris(hydroxyethyl) isocyanurate. The following polyhydroxy alcohols are preferred: diethylene glycol, 1,4-dimethanol cyclohexane, pentaerythritol, and tris(hydroxyethyl) isocyanurate.

Diallyl terephthalate oligomer and its preparation are known from U.S. Pat. No. 4,959,451, which is hereby incorporated by reference. The diallyl terephthalate oligomer may be prepared by several methods, such as the reaction between diallyl terephthalate and a diol in the presence of an ester interchange catalyst, with removal of allyl alcohol by distillation, or the reaction of dimethyl (or diethyl) terephthalate, diol, and allyl alcohol in the presence of an ester interchange catalyst, with removal of the methanol or ethanol by distillation. When moiety X is partly replaced by a residue of a polyol, the oligomer may be synthesized by using the diol in combination with a polyol or heating the oligomer of the formula I and the corresponding polyol in the presence of an ester interchange catalyst. Diallyl isophthalate oligomer, oligomers of the formula I whereby the phenylene group is 1,2-substituted, or co-oligomers of the diallyl phthalate type oligomers of the formula I may be prepared in the same manner. Preferred is the use of diallyl terephthalate oligomers in the present invention.

Examples of the diol include ethylene glycol, 1,2-propylene glycol, 1,4-butanediol, 1,6-hexanediol, 1,4-dimethanol cyclohexane, 1,3-butanediol, neopentyl glycol, 1,3-cyclohexane diol, p-xylene glycol, and styrene glycol, and other aliphatic and aromatic diols. Branched diols are preferable to linear ones. Examples of such branched diols include 1,2-propylene glycol, 1,3-butanediol, neopentyl glycol, 2,3-butanediol, 1,4-pentanediol, 1,3-pentanediol, 1,2-pentanediol, 2,3-pentanediol, 2,4-pentanediol, 1,5-hexanediol, 1,4-hexanediol, 1,3-hexanediol, 1,2-hexanediol, 2,3-hexanediol, 2,4-hexanediol, 2,5-hexanediol, and 3,4-hexanediol.

Examples of the polyols include aliphatic trihydric alcohols, such as glycerine and trimethylol propane, and aliphatic polyhydric alcohols, such as pentaerythritol and sorbitol.

Comonomers may optionally be present in the curable composition up to 20 wt %. These comonomers may be acrylic, vinylic or allylic. Examples include methyl acrylate, methyl methacrylate, phenyl methacrylate, vinyl acetate, vinyl benzoate, diallyl isophthalate, diallyl terephthalate, diallyl adipate, and triallyl cyanurate.

The compositions of the present invention also contain a polymerization initiator in quantities ranging from 0.01 to 10 wt %. This initiator should be soluble in the other components present in the composition to be cured and capable of producing free radicals at a temperature which ranges from 30° to approximately 100° C. Some non limitative examples of such initiators are organic peroxide and percarbonate initiators, especially diisopropyl peroxydicarbonate, dicyclohexyl peroxydicarbonate, di-sec-butyl peroxydicarbonate, dibenzoyl peroxide, and tert-butyl perbenzoate. For the purpose of the present invention, it is preferable for the polymerization initiator to be present in the composition in quantities from 1 to 8 wt %.

The composition may also contain, in quantities not higher than 1 wt %, one or more conventional additives to act as ultraviolet light absorbers, release agents, dyes, pigments, infrared light absorbers, etc.

Preferred is an ophthalmic lens which is the cured product of a composition comprising 0.1–9.9 wt % diallyl phthalate type oligomer. More preferably, the composition comprises 2–8 wt % diallyl phthalate type oligomer.

The present invention also relates to a process for the preparation of ophthalmic lenses with a refractive index of 1.50 to 1.51 comprising polymerization casting of the above-described composition. The polymerization process is initiated by free radicals produced by decomposition of the radical initiator at a working temperature which generally ranges from 30° to 100° C. Under these conditions the time necessary for complete polymerization ranges from 0.5 to 100 hours.

Furthermore, the present invention relates to the use of at least one diallyl phthalate type oligomer of the above-described formula I in the production of ophthalmic lenses comprising the cured product of a composition comprising at least one poly(allyl carbonate) of a polyhydroxy alcohol, said polyhydroxy alcohol having from 2 to 20 carbon atoms and from 2 to 6 hydroxy groups in the molecule, a radical initiator, and, optionally, comonomers, to improve the tintability of ophthalmic lenses and to reduce the rejection rate in the manufacture of ophthalmic lenses.

The invention will be further illustrated by the following examples which are not to be construed as limiting the invention in any way. The scope of the invention is to be determined from the claims appended hereto.

EXAMPLES

Example 1 and Comparative Examples A–D

Series of 50 ophthalmic lenses were tinted according to a conventional method. The compositions used to cast the ophthalmic lenses consisted of diethylene glycol diallyl carbonate, diisopropyl peroxy dicarbonate (IPP), and, where appropriate, additives. Table 1 lists the compositions which have been polymerized, the Barcol hardness (BH) of the ophthalmic lenses produced, their refractive indices (RI), and the percentage of lenses rejected because of tinting failure. Refractive index was measured with a Zeiss refractometer at 20° C.

TABLE 1

| lens | additive | IPP (%) | RI | BH | tinting failure |
|---|---|---|---|---|---|
| A | — | 2.9 | 1.499 | 31 | 38% |
| B | 5% Uvithane ® 893 | 2.9 | 1.498 | 31 | 28% |
| C | 3.6% TAC | 2.6 | 1.502 | 30 | 26% |
| D | 40 ppm Ortholeum ® 162 | 2.9 | 1.499 | 31 | 23% |
| 1 | 5% AEO | 2.9 | 1.502 | 32 | 4% |

Uvithane ® 893 = an oligomer of urethane diacrylate, ex Morton International
TAC = triallyl cyanurate
Ortholeum ® 162 = mixed alkyl acid orthophosphates, ex DuPont
AEO = diallyl terephthalate oligomer, ex Showa Denko poly[oxy(methyl-1,2-ethanediyl)oxycarbonyl 1,4-phenylenecarbonyl] α-[4-((2-propenyloxy)carbonyl)benzoyl] ω-(2-propenyloxy), i.e., the oligomer of the formula I, wherein X denotes methyl-1,2-ethanediyl,

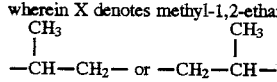

With regard to the tinting of lenses, it is shown by the results in Table 1 that lenses prepared using conventional materials still have a high percentage of rejection due to tinting failure. Where the ophthalmic lenses of the present invention are concerned, it is shown that nearly 100% success can be achieved.

Examples 2–3 and Comparative Examples E–N

Finished lenses with power minus 4 (diameter 65 mm) were prepared in the following way. A clear homogeneous solution was obtained by mixing diethylene glycol diallyl carbonate, diisopropyl peroxy dicarbonate (IPP), and, where appropriate, additives. The mixture was degassed at approximately 20 mbar for about 15 min. until gas evolution stopped. The glass mould assemblies were filled with the mixture. Polymerization took place in an oven with a polymerization cycle of 21 hours at a temperature which rises exponentially from 45° C. to 80° C.

Table 2 lists the compositions which have been polymerized, the Barcol hardness of the produced finished lenses, their refractive indices, and the premature release percentage, i.e., the percentage of products which cannot be used as a finished lens due to prerelease in the mould.

TABLE 2

| lens | additive | IPP (%) | RI | BH | premature release |
|---|---|---|---|---|---|
| E | — | 2.7 | 1.499 | 29 | 70% |
| F | — | 3.25 | 1.499 | 34 | 66% |
| G | 5% TAC | 2.65 | 1.503 | 27 | 73% |
| H | 5% TAC | 3.00 | 1.503 | 35 | 83% |
| I | 10% MMA | 3.00 | 1.499 | 35 | 100% |
| J | 0.3% DBP | 3.00 | 1.499 | 30 | 67% |
| K | 6.8% DAIP | 2.7 | 1.505 | 30 | 58% |
| L | 10% DATP | 2.7 | 1.510 | 33 | 64% |
| M | 25 ppm silane | 3.25 | 1.499 | 33 | 60% |
| N | 0.5% MA | 3.25 | 1.499 | 30 | 90% |
| 2 | 5% AEO | 2.7 | 1.502 | 30 | 40% |
| 3 | 9.9% AEO | 2.7 | 1.505 | 31 | 30% |

TAC = triallyl cyanurate
MMA = methyl methacrylate
DBP = dibutyl phthalate
DAIP = diallyl isophthalate
DATP = diallyl terephthalate
MA = maleic anhydride The results in Table 2 indicate that the production of finished lenses prepared with conventional compositions is attended with a very high percentage of rejection. This is even the case with compositions comprising a commercial adhesion promotor, such as silane or maleic anhydride (Examples M and N). However, the finished lenses according to the present invention have a percentage of rejection which is significantly lower than that of the comparative products.

We claim:

1. An ophthalmic lens with a refractive index from 1.50 to 1.51, comprising the cured product of a composition comprising 60–99 wt % of at least one poly(allyl carbonate) of a polyhydroxy alcohol, said polyhydroxy alcohol having from 2 to 20 carbon atoms and from 2 to 6 hydroxy groups in the molecule, 0.01–10 wt % of at least one radical initiator, and 0–20 wt % of comonomers, wherein at least one diallyl phthalate type oligomer is present in the composition, in an amount of less than 10 wt %, said diallyl phthalate type oligomer being of the formula I

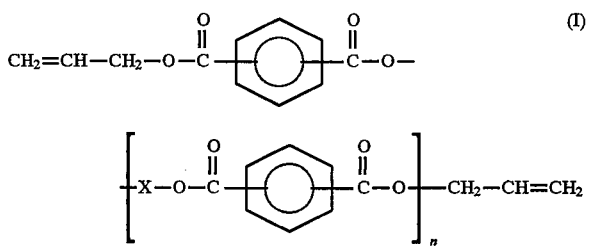

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100, said oligomer having a degree of unsaturation of 20–100 in terms of iodine value measured according to the Wijs method.

2. Ophthalmic lens according to claim 1, wherein said diallyl phthalate type oligomer is present in said composition in an amount of 0.1 to 9.9 wt %.

3. Ophthalmic lens according to claim 2, wherein said diallyl phthalate type oligomer is present in said composition in an amount of 2 to 8 wt %.

4. Ophthalmic lens according to according to claim 1 wherein characterized in that said poly(allyl carbonate) of polyhydroxy alcohol is present in the composition in the form of a monomer.

5. Ophthalmic lens according to claim 4, wherein monomer of poly(allyl carbonate) of polyhydroxy alcohol is diethylene glycol diallyl carbonate.

6. Ophthalmic lens according to claim 1 wherein characterized in that said lens is a finished lens.

7. Ophthalmic lens according to claim 1 wherein characterized in that said lens has been tinted in a conventional way.

8. Process for the production of ophthalmic lenses with a refractive index of 1.50 to 1.51 comprising polymerization casting of a curable composition comprising 60–99 wt % of at least one poly(allyl carbonate) of a polyhydroxy alcohol, said polyhydroxy alcohol having from 2 to 20 carbon atoms and from 2 to 6 hydroxy groups in the molecule, 0.01 to 10 wt % of at least one radical initiator, and 0–20 wt % of comonomers, at 30°–100° C. for 0.5–100 hours, wherein the polymerization casting is carried out in the presence of at least one diallyl phthalate type oligomer in an amount less than 10 wt %, said diallyl phthalate type oligomer being of the formula I

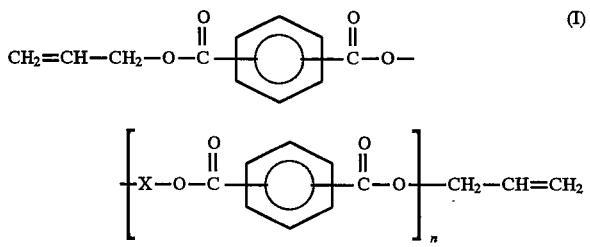

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100, said oligomer having a degree of unsaturation of 20–100 in terms of iodine value measured according to the Wijs method.

9. A method for reducing prerelease during polymerization casting in the manufacture of ophthalmic lenses which comprises polymerization casting a curable composition which comprises 60–99 wt % of at least one poly(allyl carbonate) of a polyhydroxy alcohol, said polyhydroxy alcohol having from 2 to 20 carbon atoms and from 2 to 6 hydroxy groups in the molecule, 0.01 to 10 wt % of at least one radical initiator, and 0–20 wt % of comonomers, at 30–100° C. for 0.5–100 hours, in the presence of at least one diallyl phthalate type oligomer in an mount less than 10 wt % wherein said diallyl phthalate type oligomer is of the formula I

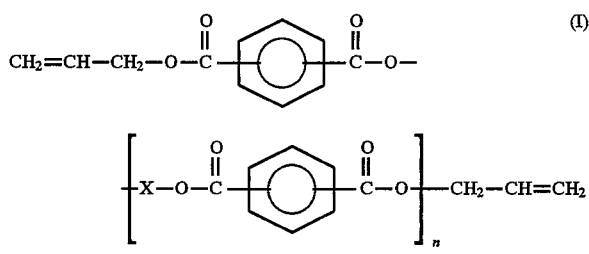

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100, said oligomer having a degree of unsaturation of 20–100 in terms of iodine value measured according to the Wijs method.

10. A method for improving the tintability of opthalmic lenses which comprises polymerization casting a curable composition which comprises 60–99 wt % of at least one poly(allyl carbonate) of a polyhydroxy alcohol, said polyhydroxy alcohol having from 2 to 20 carbon atoms and from 2 to 6 hydroxy groups in the molecule, 0.01 to 10 wt % of at least one radical initiator, and 0–20 wt % of comonomers, at 30–100° C. for 0.5–100 hours, in the presence of at least one diallyl phthalate type oligomer in an amount less than 10 wt % wherein said diallyl phthalate type oligomer is of the formula I

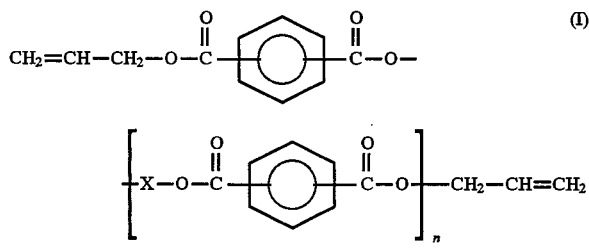

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100, said oligomer having a degree of unsaturation of 20–100 in terms of iodine value measured according to the Wijs method.

* * * * *